Dec. 9, 1958  J. E. GROSE  2,863,376
DRIP COFFEE MAKER
Filed Aug. 20, 1954  2 Sheets-Sheet 1
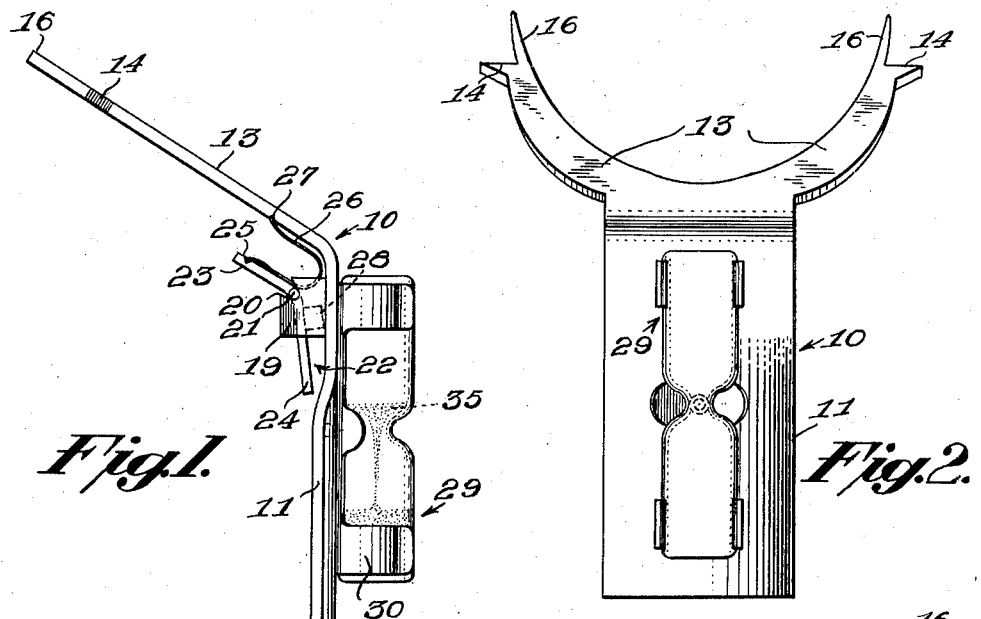
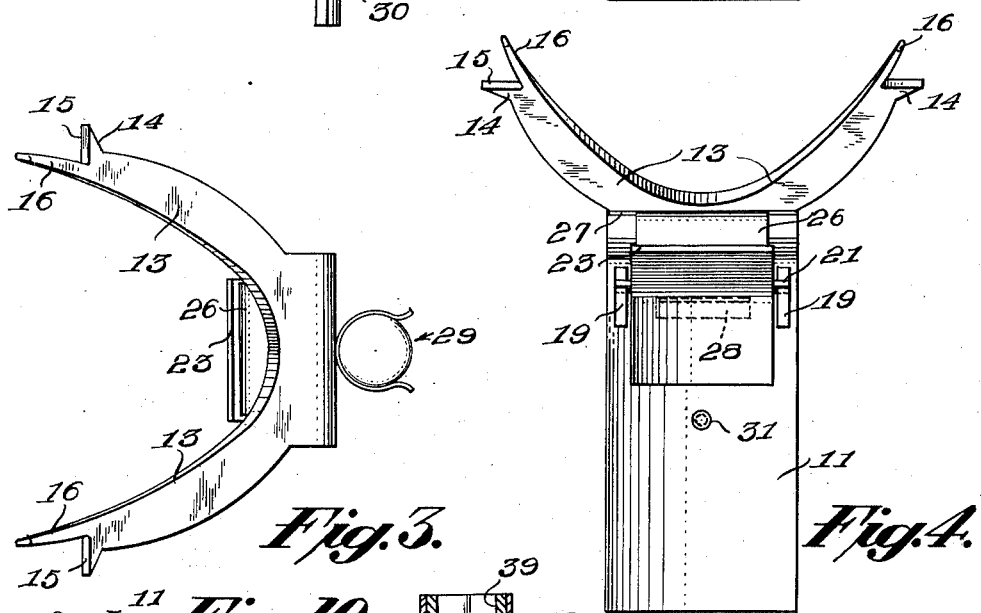
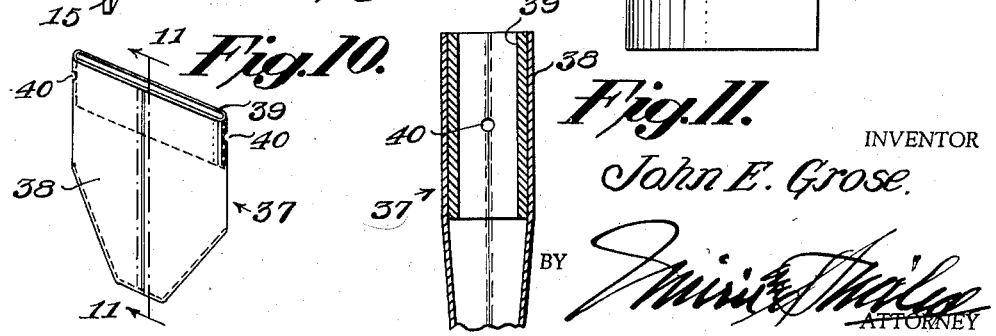
INVENTOR
John E. Grose.
BY
ATTORNEY Dec. 9, 1958   J. E. GROSE   2,863,376
DRIP COFFEE MAKER
Filed Aug. 20, 1954   2 Sheets-Sheet 2
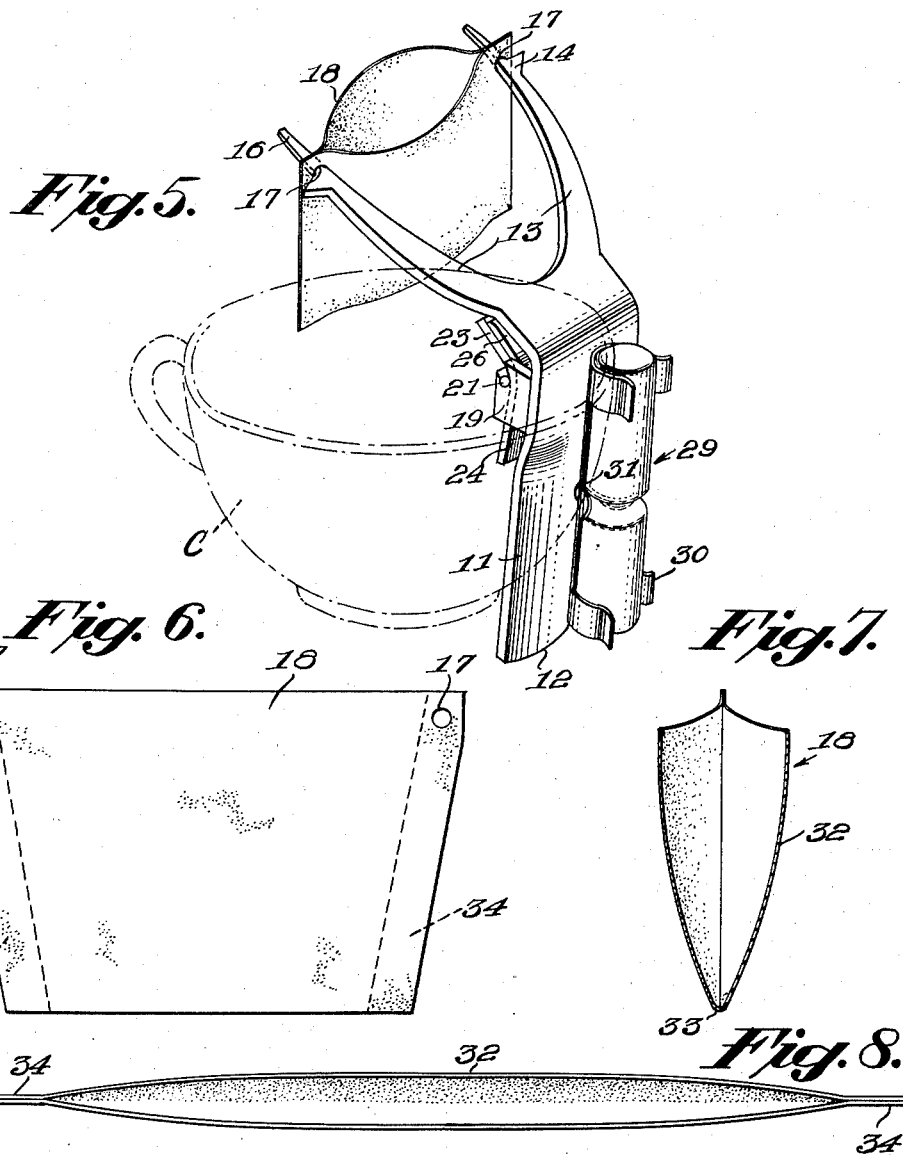
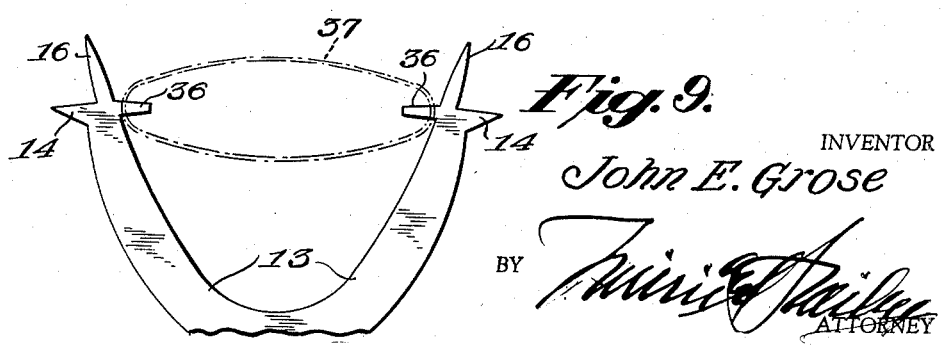
INVENTOR
John E. Grose
BY
ATTORNEY

2,863,376

DRIP COFFEE MAKER

John E. Grose, Washington, D. C.

Application August 20, 1954, Serial No. 451,249

3 Claims. (Cl. 99—316)

This invention relates to beverage-makers, and more partcicularly to the drip type of beverage-makers which employ a disposable filter receptacle, and especially that type which is adapted for making a single cup of beverage. These devices are primarily employed as coffee-makers, and will be so described, but may be employed with tea or other ingredients.

Many and varied devices have been proposed for making but a single cup of coffee at a time, and these range all the way from small coffee-pots of various types to pervious disposable receptacles. These devices have not enjoyed wide use, however, due to the fact that the pot type of maker, whether percolator, drip, or vacuum type, entails cleaning and other work which more than overcome the benefits derived from the small type of device. The pervious receptacle drip makers, on the other hand, have not enjoyed wide use because they entailed too much work in setting them up, would not operate efficiently, required considerable care in use, and for other various reasons.

Having in mind the defects of the prior art apparatus and methods, it is an object of the present invention to provide a drip type of coffee-maker, including a disposable filter receptacle that has simplicity of design, economy of construction, and efficiency in operation, in producing a true and fresh coffee beverage.

It is another object of the invention to provide a drip type of coffee-maker that is capable of efficiently making but one cup of coffee.

It is a further object of the invention to provide a drip type of coffee-maker which is of relatively small dimension to permit ready transportation thereof, so that it is particularly adaptable for use when traveling.

The foregoing objects, and others ancillary thereto, are preferably accomplished, in accordance with a preferred embodiment of the invention, by a coffee-maker comprising a receptacle of pervious material and a support for the receptacle which is securable to a cup for disposal of the receptacle above the same. The receptacle is in the form of a relatively deep, open-topped normally flat envelope having stiffened marginal portions provided with apertures for the reception of projections on the said support.

The support is in the form of a body member which is engageable with the outer wall of a cup, and a jaw member is pivotally supported by the body member and is yieldably engageable with the inner wall of the cup whereby the support is capable of being readily engaged with and disengaged from a cup. Furthermore, the body member includes a pair of diverging prongs disposable above the cup and which are provided with projections for extension through the apertures in the receptacle.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawing, wherein like reference characters indicate like parts throughout the several figures, and in which:

Figure 1 is a side elevational view of the improved coffee receptacle support in accordance with a preferred structural embodiment thereof;

Figure 2 is a rear elevational view of the support;

Figure 3 is a top plan view of the support;

Figure 4 is a front elevational view of the support;

Figure 5 is a perspective view showing the support in operative engagement with a cup indicated in dot-and-dash lines and also showing a coffee receptacle suspended from the support over the mouth of the cup;

Figure 6 is a side elevational view of a coffee receptacle which is particularly adapted for use with the support;

Figure 7 is a vertical sectional view of the receptacle in a coffee receiving distended condition;

Figure 8 is a top edge view of the receptacle on an enlarged scale with the side walls thereof separated and particularly illustrating the opposite end reinforced edges;

Figure 9 is a fragmental top plan view showing a modified embodiment of the support for use with another form of coffee receptacle;

Figure 10 is a perspective view of a modified form of the coffee receptacle; and Figure 11 is an enlarged fragmental sectional view on the plane of line 11—11 on Figure 10.

Referring now in detail to the drawings, the improved support comprises a body member 10 which is preferably of plastic material, but which may be of any other material. The body member 10 comprises a generally rectangular normally upright base portion 11 whose lower end is arcuate transversely as indicated at 12 for conformity with the wall curvature of a cup C, and whose upper end portion 11, is transversely straight whereby the vertical center of the back of the portion 11 is in a straight line as is apparent from Figure 1.

The body member 10 further includes a pair of arms or prongs 13 which project laterally from the base portion 11 and which also project upwardly in a plane intersecting the straight line above referred to at an acute angle. The prongs 13 are laterally curved outwardly in diverging relation in said plane and are each provided with forwardly extending receptacle supporting lugs 16 and a laterally extending outwardly directed lug 14 at the inner end of the lugs 16 and the forward faces 15 of the lugs 14 provide receptacle engageable shoulders. As will be more completely described hereinafter, the lugs 16 are insertable in apertures 17 in opposite ends of a receptacle 18 (Fig. 6).

The base portion 11 is provided with a pair of ears 19 projecting inwardly from its inner face and disposed in laterally spaced relation. The ears 19 are disposed slightly below the juncture of the prongs 13 with the base portion 11 and each ear thereof is provided with an outwardly opening scoring recess 20. Pivotally supported in the recesses 20 are laterally opposed pintles 21 rigid with an angular jaw member 22 including upper and lower angularly related portions 23 and 24 respectively, the pintles 21 being disposed at the juncture of said portions.

The upper portion 23 of the jaw member 22 is planed and is provided with a lateral disposed notch 25 in which is normally disposed one end of a V-leaf spring 26. The opposite end of the spring is normally disposed in a notch 27 in the inner face of body member 10 at the base of the prongs 13. The spring is disposed adjacent the base portion 11 and the opposite arms of the spring normally urge the lower jaw portion 24 toward the said base portion. The jaw portion 24 is preferably provided with a stop bar 28, which is engageable with the inner face of the base portion 11 as indicated in Figure 1. Preferably the portion 24 is arcuate transversely in conforming with the lower end of the base portion 11.

The structure preferably includes a timing device which is disclosed in the form of an hour glass 29, the frame 30 of which is pivotally supported on the rear face of the base portion 11 as by a pivot 31. This timing device is adapted to indicate a predetermined period, such as, say, two minutes.

The improved coffee-maker includes the disposable filter receptacle of which the preferred form, as shown in Figs. 6, 7 and 8 comprises a single sheet of thermoplastic filter paper 32 which is folded over at 33 and opposite side edges of the folded sheet portions intermediate the fold 33 and the open mouth of the receptacle are heat sealed in the relatively wide areas 34 which provide the receptacle with reinforced ends. The apertures 17 are located within these reinforced areas 34.

The pervious envelope is made of thermoplastic filter paper which comprises a filter paper impregnated with a thermoplastic. This type of paper has an advantage both in use and in manufacture. In use it has been found that the thermoplastic filter paper has greater strength and resists disintegration or tearing, particularly upon becoming liquid-saturated. Furthermore, it restricts seepage therethrough to a minor degree, which permits a more complete dissolution of the flavor from the ground coffee.

In the use of the improved coffee-maker, the support 10 is clipped on the wall of a cup C which is to receive the coffee or other beverage. This mounting of the support 10 is accomplished by extending a finger between the prongs 13 from the rear of the base portion 11 and exerting upward pressure on the upper jaw portion 23 with a resulting outward movement of the lower jaw portion 24 from the inner face of the base portion 11. The body member is then lowered over the cup with an upper portion of the wall thereof disposed between the base portion 11 and the jaw portion 24, whereupon the jaw portion 23 is released with a resulting clamped position of the body member 10 on the cup C as indicated in Fig. 5.

With the support thus positioned, the receptacle 18 is mounted on the support 10 and over the cup C, as shown in Figure 5. The receptacle is mounted on the lugs 16 by insertion of said lugs in the apertures 17 and with the reinforced marginal portions 34 of the receptacle resting against the shoulders 15. It is to be observed at this point that the spacing of the apertures 17 exceeds the distance between the lugs 16 so that when the lugs are inserted in the apertures the upper edges of the receptacle are biased and retained open, as shown in Figure 5, for the reception of a measured charge of coffee.

With the receptacle thus positioned, a measured volume of hot water, which is preferably substantially equal to the capacity of the cup C, is slowly poured into the open receptacle 18 whereby the flavor of the coffee is dissolved from the grounds and seeps through the pervious sheet material of the receptacle and into the cup C. After the liquid has dripped through the receptacle 18, the receptacle with the grounds therein are discarded.

It is well known that the palatability of coffee is largely dependent upon the period of time to which the grounds are subjected to hot water and accordingly, the hour glass 29 provides a visible means for timing of the pouring of the hot water into the receptacle 18 since one, once accustomed to the use of the improved coffee-maker will be able to pour the hot water into the receptacle at a corresponding rate of the flow of the granular material 35 from one end of the hour glass to the other end thereof, through the restriction therebetween. The pivotal construction 31 of the hour glass provides for placing the mass of granular material 35 at the upper end of the hour glass preparatory to each coffee making operation.

In Figure 9 is disclosed a modified embodiment of the invention wherein the prongs 13 are provided with inwardly directed and laterally opposed lugs 36 which are preferably inclined upwardly at a slight angle. The lugs 36 are adapted for use with a modified form of receptacle 37 shown in detail in Figures 10 and 11. The receptacle 37 comprises an envelope 38 of pervious thermoplastic filter paper and a stiffened collar portion 39 of cellulosic material. The pervious section 38 may comprise any pervious material, such as cloth or paper, but preferably, like the preferred form, is made of thermoplastic filter paper.

The collar section 39 provides additional strength at the top of the receptacle and forms the necessary support between the points of support at the apertures 40 which receive the lugs 36, as shown in Figure 9. Furthermore, the collar section provides the desired resistance to bending which creates the resilience for engaging the prongs 13 to maintain the lugs 36 in the apertures 40. The apertures 40 are spaced apart a greater distance than the spacing of lugs 36 whereby the receptacle assumes the opened position of Figure 9 when engaged with the support prongs 13. While the receptacle 37 may be of any desired configuration, the bottom corners thereof are preferably removed to provide inwardly inclined lower side portions which cause the liquid, as it seeps through the pervious material to migrate toward the bottom portion of the center of the receptacle.

Although certain specific embodiments of the invention have been shown and described, it is obvious that many modifications thereof are possible. The invention, therefore, is not to be restricted except in so far as is necessitated by the prior art and by the spirit of the appended claims.

What I claim and desire to secure by United States Letters Patent is:

1. A drip beverage filter receptacle having a pair of opposed apertures for receiving a pair of spaced supporting elements, which receptacle comprises an open-topped flat folded envelope formed of a cellulosic filter sheet material and having permanently sealed side and bottom edges, foldable cellulosic stiffening material around the open top of said envelope and with the element receiving apertures in the stiffened portion at the side folds of said envelope, the stiffened top portion of said envelope being wider than the spacing of the supporting elements to be opened by compression between the elements and to be tensioned toward the elements to provide a firm support.

2. A drip type beverage maker comprising in combination a disposable normally flat open topped receptacle formed of flexible filter paper and having stiffened portions adjacent the side edges thereof, each of said opposite side edge portions having an aperture disposed within the stiffened portions thereof, and a holder for said receptacle including a support having means removably engageable with the side wall of a cup for supporting said holder on the cup, and laterally diverging arms extending at an angle from said support and overlying the mouth of the cup when said means are engaged with the cup, said arms each terminating in a shoulder with a lug extending therefrom, the lugs of said arms being respectively receivable within said apertures for supporting the receptacle above the cup with the shoulders abuttable by the receptacle, the distance between said apertures being greater than the distance between said lugs whereby engagement of said lugs in said apertures compresses the side edge portions toward each other and spreads the open top of the normally flat receptacle for the reception of beverage grounds and liquid.

3. A drip type beverage maker comprising, in combination, a disposable normally flat open topped receptacle formed of flexible filter paper and having stiffened portions adjacent the side edges thereof, each of said opposite side edge portions having an aperture disposed within the stiffened portions thereof, and a holder for said receptacle including a support having means removably engageable with the side wall of a cup for supporting said holder on the cup, and laterally diverging arms extending at an angle from said support and overlying the mouth of the cup when said means are engaged with the cup, said arms each terminating in a pair of lugs respectively extending forwardly and laterally with respect to said arms, the corresponding lugs of said arms being respectively receivable within said apertures for supporting the receptacle above the cup and the other corresponding lugs forming shoulders abuttable by the receptacle, the distance between said apertures being greater than the distance between said lugs whereby engagement of said lugs in said apertures compresses the side edge portions toward each other and spreads the open top of the normally flat receptacle for the reception of beverage grounds and liquid.

References Cited in the file of this patent

UNITED STATES PATENTS

| | | |
|---|---|---|
| 299,706 | Webster | June 3, 1884 |
| 678,720 | Cochrane | July 16, 1901 |
| 731,920 | Leach | June 23, 1903 |
| 961,886 | Myers | June 21, 1910 |
| 1,016,104 | Smith | Jan. 30, 1912 |
| 1,053,823 | Johnson | Feb. 18, 1913 |
| 1,061,942 | Jacobson | May 13, 1913 |
| 1,762,207 | Aborn | June 10, 1930 |
| 2,027,272 | Flood | Jan. 7, 1936 |
| 2,103,572 | Wells | Dec. 28, 1937 |
| 2,273,422 | Schroeder | Feb. 17, 1942 |
| 2,277,050 | Reed et al. | Mar. 24, 1942 |
| 2,397,902 | McDill | Apr. 2, 1946 |
| 2,429,389 | Calentine | Oct. 21, 1947 |
| 2,477,000 | Osborne | July 26, 1949 |
| 2,558,668 | Bjork | June 26, 1951 |

FOREIGN PATENTS

| | | |
|---|---|---|
| 451,197 | Great Britain | July 31, 1936 |
| 244,009 | Switzerland | Feb. 17, 1947 |